United States Patent [19]
Schmitz

[11] 3,993,172
[45] Nov. 23, 1976

[54] COOLED, EXTERNALLY ENGAGED DRUM BRAKE

[76] Inventor: Peter H. Schmitz, Bahnhofstr. 8, 4401 Altenberge, Westphalia, Germany

[22] Filed: Aug. 25, 1975

[21] Appl. No.: 607,453

Related U.S. Application Data

[63] Continuation of Ser. No. 469,000, May 10, 1974, abandoned.

[52] U.S. Cl. ............................. 188/75; 188/18 R; 188/264 R; 192/79; 192/113 A
[51] Int. Cl.² ......................................... F16D 49/00
[58] Field of Search ............... 188/18 R, 74, 75, 56, 188/264 R; 192/79, 113 A

[56] References Cited
UNITED STATES PATENTS

| 187,366 | 2/1877 | Elward | 188/75 |
| 891,267 | 6/1908 | Lafaelle | 192/79 X |
| 2,330,790 | 9/1943 | Eksergian | 188/18 R |
| 3,007,352 | 11/1961 | Biedess | 188/264 R X |
| 3,186,516 | 6/1965 | Stump | 188/18 R |
| 3,396,823 | 8/1968 | Simanek et al. | 188/56 |

FOREIGN PATENTS OR APPLICATIONS

| 35,707 | 6/1935 | Netherlands | 188/75 |

*Primary Examiner*—George E. A. Halvosa
*Attorney, Agent, or Firm*—Allegretti, Newitt, Witcoff & McAndrews

[57] ABSTRACT

A brake is disclosed for use with motor vehicles and particularly with motor vehicle trailers having heavy axles. The brake includes a brake ring which is connected securely to the wheel hub. At least two brake shoes act on the external peripheral surface of the brake ring. Each brake shoe is mounted on one end of a two-arm lever. The two-arm levers may be mounted on the axle. The other ends of the two-arm levers are actuated by a hydraulic operating device, such as a hydraulic or pneumatic cylinder.

3 Claims, 4 Drawing Figures

COOLED, EXTERNALLY ENGAGED DRUM BRAKE

This is a continuation of my application Ser. No. 469,000, filed on May 10, 1974 and now abandoned.

BACKGROUND OF THE INVENTION

The invention relates to an improved brake for motor vehicles and more particularly to an improved brake for the trailers of such vehicles.

It has been usual for many years to use so-called internal expanding shoe brakes for motor vehicles. Such brakes comprise a brake drum secured to the wheel hub and nested as close as possible into the wheel rim so as to obtain a large brake drum diameter. The brake shoes are situated in a so-called brake plate which is arranged on the body of the axle, are hydraulically or pneumatically operated and are arranged in a multiple arrangement and with complicated bearing means. These internal expanding shoe brakes, however, have many disadvantages and at the present time, they are only just able to meet the legal requirements regarding continuous braking for heavy axles such as are used on trailers.

It has been attempted to increase the braking capacity of internal expanding shoe brakes with trailer axles by arranging additional internal expanding shoe brakes towards the center of the axle. But since these additional brakes have not proved to be very successful, and since they involve a considerable capital outlay, this arrangement has not been widely adopted. In order to meet the legal requirements regarding continuous braking, the brake drums have been strengthened, widened and increased in diameter. However the disadvantages still exist.

Within the brake drum, the brake shoes are mounted on the body of the axle and are so arranged that they come to abut the brake drum by opening out of the shoe ends. Owing to the direction of rotation of the brake drum, one shoe runs against its bearing; whereas, the other runs off the bearing. The brake linings are, thus, subjected to very different amounts of wear. The running-on shoes develop a higher application pressure which results in considerable stress on the brake lining and brake drum. As a result, both the lining and brake drum become heated to too great an extent, and are subjected to premature wear. Moreover it is difficult to dissipate the heat produced in the lining and brake drum. Also, there is often an undesirable "grabbing" effect which extends to the extent of resonance in the shoes and drum and causes a high-frequency whistling that increases particularly at night so as to be a very unpleasant noise.

The aforesaid stress occurs more particularly on trailer brakes. These brakes also have to deal with the additional continuous braking operations which, in trucks, are caused by the engine brake effect resulting from throttling the exhaust piping.

The trailer brakes must also be adjusted with a certain amount of lead time so that the cab-trailer train remains extended when a braking operation is carried out and so that jack-knifing is prevented. This measure also subjects the trailer brake to additional stress during each braking operation. In addition, dirt collects in the brake drum, and in a braking operation, results in much wear on the brake drum.

The excessive stress on the brake lining and brake drum requires excessively frequent renewal of these parts, which is expensive and time consuming, and causes many failures. During continuous braking, there is a drop in braking power because the drum and brake linings become hot. This drop in braking power is particularly disadvantageous and dangerous when carrying out a full braking operation with a hot brake.

The known and relatively effective disc brakes are, more and more, taking the place of the internal expanding shoe brakes, particularly in private motor cars. Disc brakes have not been widely adopted, however, in the case of heavy axles. The arrangement and operation of the brake shoes in the housing, particularly with respect to having the shoes engage over the external periphery of the disc brake, is difficult owing to the space conditions, especially if high braking forces have to be transmitted.

The electrical and hydraulic so-called retarders which are also known and which are used additionally to affect continuous braking operations with the friction brake have also not been widely adopted. The outlay with regard to cost, weight and space occupied has just been too great.

Therefore, the present invention has as its object to provide an improved brake which fully satisfies the legal requirements regarding continuous braking, which is simple in construction, which allows easy access, which allows facile replacement of parts, which can transmit considerable braking forces, and which minimizes the disadvantageous effects on other parts of the brake resulting from the friction heat produced. According to the present invention, this object is achieved providing an improved brake wherein a brake ring is connected securely to the wheel hub. At least two brake shoes act on the external peripheral surface of the brake ring, and each are arranged at one end of a two-arm lever. The other ends of the two-arm levers are acted upon by a hydraulic operating device.

The hydraulic operating device may be a hydraulic or pneumatic cylinder which is connected to the other end of one of the two-arm levers and whose piston rod is connected to the other end of the other two-arm lever. However, it is also possible to provide a separate hydraulic operating cylinder for each two-arm lever. In such a situation, the cylinders would preferably bear against the body of the axle and their piston rods would engage the other ends of the two-arm levers. Furthermore, the hydraulic cylinder can have a floating-mounting and can be situated outside the axle body or can extend through the axle body or can be situated at one side of the axle body. In the latter case a rod can be used to connect the cylinder to the two-arm lever situated at the other side of the axle body.

The pivot points of the two two-arm levers are formed in bearing brackets on the axle body. The levers can extend in a rectilinear manner if two hydraulic cylinders, which are supported at the center of the axle, are used or if one hydraulic cylinder is used and its piston rod has an extension extending through the body of the axle. In the case of cylinders mounted outside the axle body, elbowed levers are to be used.

Mounted on the one end of each of the two-arm levers is a brake shoe which is connected pivotably and positively to the two-arm lever so that a uniform wear on the brake lining is ensured. More particularly, by arranging the hydraulic operating device in a so-called floating mounting or arrangement between the appropriate other ends of the two-arm levers, brake balance is ensured. The hydraulic operating device is preferably actuated by means of compressed air of the vehicle by means of a hydraulic transmitter cylinder that supplies the hydraulic operating cylinder which is located directly adjacent to the levers. By this arrangement, there is no need for special re-adjustment of the improved brake when there has been wear on the brake linings since the travel of the operating cylinder which is available is sufficient for re-adjustment.

The brake ring, made from appropriate material and with appropriate dimensions, is secured to the wheel hub 13 by means of a spacer ring. The axis of the brake ring coincides with the axes of the stub axle. The spacer element can be constructed as a bladed wheel so that on rotation, it can be utilized to draw cooling air through the brake ring and blow it out again outside the brake ring and between the ring and the adjacent rim of the wheel. The brake ring can be connected with the spacer ring by means of bolts situated in blind holes in the brake ring or the brake ring and the spacer ring can form a single unit. In the latter case, the combined spacer ring-brake ring would be secured to the hub. In the first case, the hub is connected securely to the spacer ring. But it is also possible to construct all the parts independently and to connect them by screws or other suitable detachable securing means in such a manner that the spacer ring is connected detachably to the hub and the brake ring, itself, is connected detachably to the spacer ring.

The improved brake, according to the present invention, provides a brake which has brake linings of long service life, which can tolerate high application pressures on brake linings and brake ring and which can tolerate higher temperatures than in the case of drum brakes, and even disc brakes, if in the case of the latter the hydraulic operating cylinder is situated directly in the zone radiating heat. Also, the disadvantage of brake drum wear, which is so significant in the case of drum brakes, does not occur. Likwise the improved brake of the present invention minimizes the difficulty of replacing brake linings and the differing amounts of wear on the brake linings by running-on and running-off shoes.

Similarly, there is no drop in braking power during continuous braking operations. Above all, the drop in braking power, when carrying out full braking with the brake hot, is obviated. In order to avoid the excessively high pressure between the shoes and the brake ring that might build up in a continuous braking operation as a result of the diameter of the brake ring expanding due to the heat of friction, the electro-pneumatic control valve of the continuous brake is preferably preceded by a conventional interval switch. As a result of an interruption in current at suitable intervals, the interval switch thus controls the operation of the control valve so that a brief pressure drop is produced at suitable intervals. These brief pressure drops obviate a continual rise in application pressure on the part of the brake shoes against the brake ring.

Accumulations of dirt at the shoe brakes within the brake drum, which can cause premature wearing of the lining and drum, cannot occur with a ring brake of the present invention. On the contrary, in the improved brake of the present invention, dust and dirt which arrive are stripped off the brake ring and drop out.

The invention will be explained in detail in connection with the preferred embodiment of the present invention shown in the drawings.

DESCRIPTION OF THE DRAWINGS

When the improved brake of the present invention is used with a motor vehicle, such as a heavy axle on a trailer, a brake would be positioned and utilized on both sides or ends of the axle. Since the structure and function of both of these two brakes are identical, only one side of an axle, with a hub and improved brake according to the present invention, will be shown in the drawings and described herein.

DESCRIPTION OF THE PREFERRED EMBODIMENT

Figure 1:
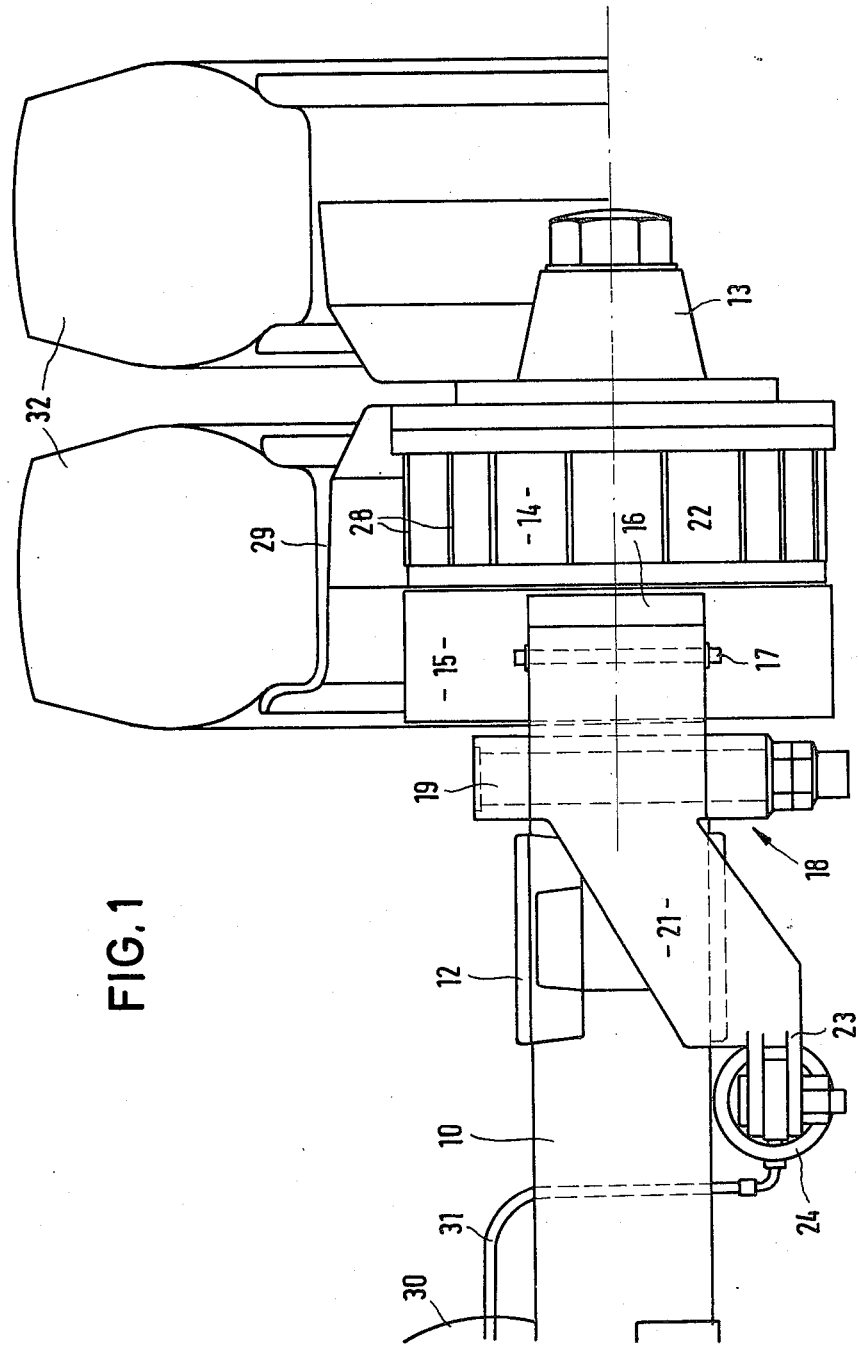
FIG. 1 shows a partial side view of an improved brake of the present invention mounted on an axle.
Figure 2:
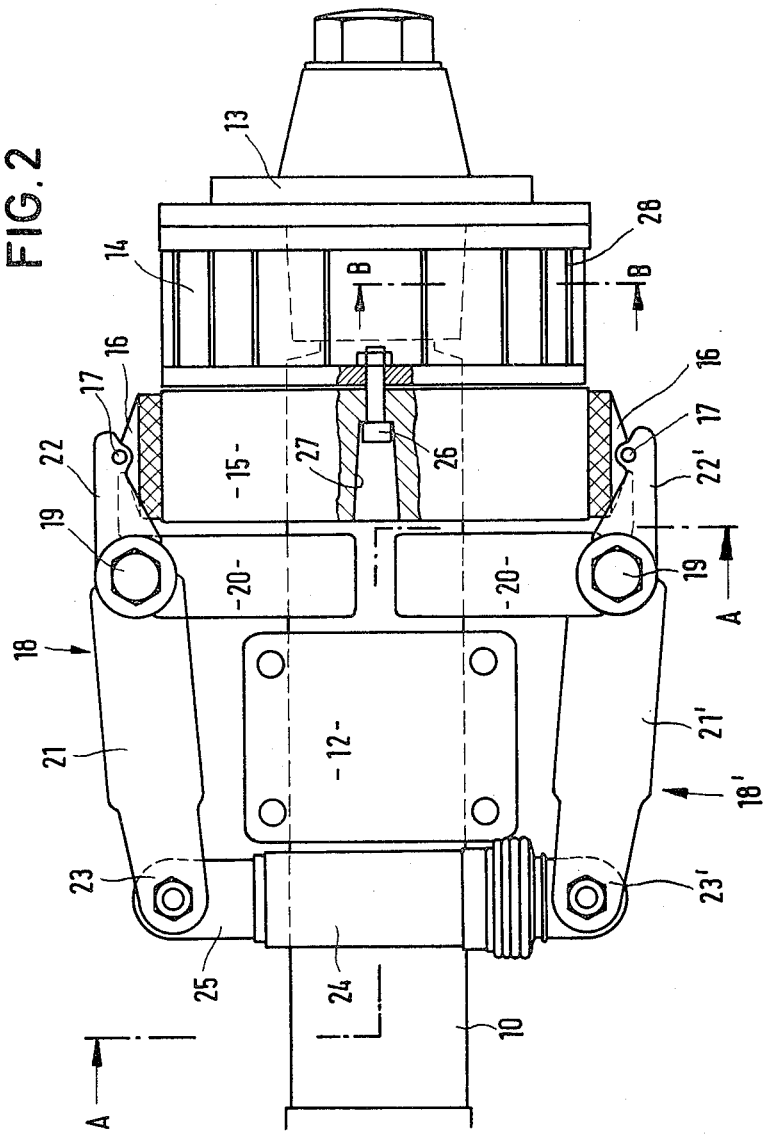
FIG. 2 shows a partial bottom view of the improved brake and axle shown in FIG. 1.

The reference numeral 10 in FIG. 1 designates the body of the axle. Spring supports 12 and a hub 13 are mounted on the axle. Secured on the hub 13 by means of a spacer element 14 is a brake ring 15 which cooperates with the brake shoes 16. The shoes are connected, by means of a pin 17 to two, substantially identical two-arm levers 18 and 18[1] in such a manner that the shoes 16 may be pivoted about the axis of the pins 17. The levers 18 and 18[1] are mounted on the axle 10 by means of pins 19 of the bearing brackets 20 and are adapted to pivot about the axis of the pins 19. The arm 21 of the two-arm lever 18 is cranked relatively to the arm 22 which carries the brake shoe 16 so that the end 23 of the arm 21 can be acted upon by a hydraulic cylinder 24. The arm 21[1] of the two-arm lever 18[1] is similarly cranked relatively to the arm 22[1] which carries the other brake shoe 16. The cylinder 24 is mounted in "floating" fashion below the body of the axle, as best seen in FIG. 2. The other end 25 of the cylinder 24 receives and acts upon the end 23[1] of the arm 21[1] of the other two-arm lever 18[1]. The lengths of the arms 21, 21[1] are greater than the lengths of the arms 22, 22[1].

Figure 3:
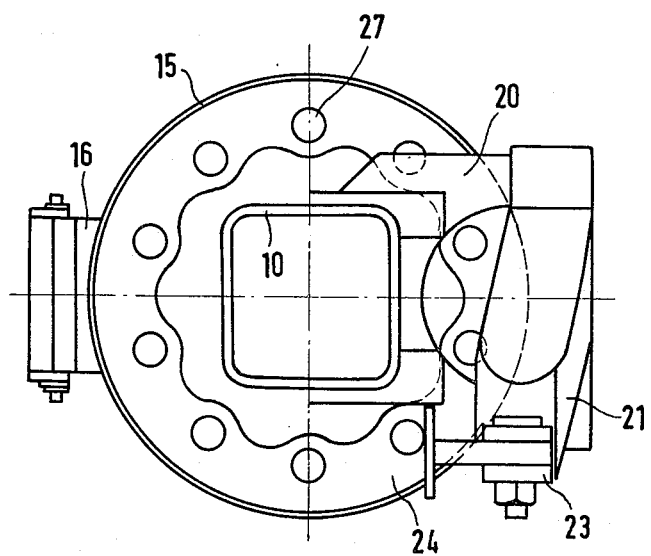
FIG. 3 is a partial, transverse, cross-sectional view taken along the line A—A of FIG. 2.

As FIG. 2 shows, the brake ring 15 is connected by a plurality of bolts 26 to the spacer element 14. The bolts 26 are situated in blind holes 27 shown in FIG. 3. Alternatively the ring 15 could be made in one piece with the spacer element 14, and the combined element ring 14–15 could then be secured directly to the hub 13. Also the hub 13 could be made in one piece with the spacer ring 14. On the other hand both the spacer ring 14 and the brake ring 15 can be separate members and can be secured to one another and to the hub by bolts as noted above.

Figure 4:
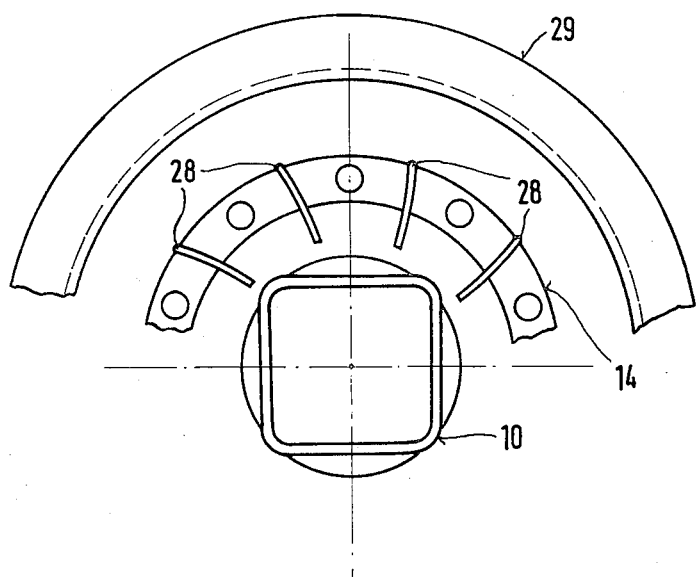
FIG. 4 is a transverse cross-sectional view taken along the line B—B of FIG. 2.

The spacer element 14 is preferably provided, as shown in FIG. 4, as a wheel with blades 28 that are disposed in such a manner that during normal running or rotation of the element 14, cooling air is drawn into the brake ring 15 and blown out again through the blades 28 between brake ring 15 and wheel rim 29.

As noted, the brake cylinder 24 had been described as being mounted in a "floating" fashion below the axle 10 such that it can operate both ends 23, 23[1] of the two-arm brake levers 18 and 18[1]. However, the "floating" mounted cylinder 24 can also be mounted straight through the axle 10 whereby the levers 18 and 18[1] can then be rectilinear. Finally, it is also possible to arrange the operating cylinder 24 outside the axle 10, namely between one of the ends 23 or 23¹ of a two arm lever and the axle. In this modified embodiment, the operation of the other end 23¹ or 23 of the levers would be affected by means of a rod that extended through the axle body. In this modified embodiment, there would also be compensation of the braking moment as in the embodiment shown in FIGS. 1 and 2. On the other hand, however, the ends 23 and 23¹ of the rectilinear two-arm brake levers 18 and 18¹ could also be operated in this modified embodiment by separate hydraulic cylinders which would be disposed between an end 23, 23¹ and the axle body 10 and which would bear directly on the axle body 10. The compensation would be achieved by means of the hydraulic system utilized.

The operation of the improved brake of the present invention is effected by means of a pneumatically operated transmitter cylinder 30, shown in FIG. 1. A hydraulic conduit 31 leads from the cylinder 30 to the brake cylinder 24 which, as noted above, is mounted in "floating" fashion and acts as a receiver cylinder. The arms 21, 21¹ are opened out, away from the adjacent sides of the axle body 10, when pressure medium is supplied to the cylinder 24 so that the two-arm levers 18 and 18¹ pivot about the pivot pins 19 and the brake shoes 16 are thus pressed against the outer peripheral surface of the brake ring 15. It can be seen that the operating mechanism for the improved brake is situated entirely outside the space in which the frictional braking action takes place. The hydraulic cylinder 24 which operates the two-arm levers 18 and 18¹ is situated relatively far from the heat-developing friction between the ring 15 and the shoes 16 so that the hydraulic fluid in the cylinder 24 cannot be heated. This is in contrast to the conventional types of brakes, such as internal expanding shoe brakes and disc brakes, wherein the cylinders used therein are situated substantially within the region in which the considerable development of heat occurs.

The brake ring 15, itself, held by the spacer element 14 out of the space within or immediately adjacent to the wheel rim 29, is sufficiently separated from the wheel rim 29 so that the heat radiated in a braking operation from the ring 15 cannot influence the wheel rim 29 and the tire 32 in a disadvantageous way. The brake ring 15 can also be modified as regards its proportions in contrast to the view shown in FIGS. 1 and 2. In other words, the ring 15 can be a greater axle length than that shown.

It can also be seen that the operating devices such as the levers, shoes and cylinders are easily accessible and can be constructed and arranged appropriately without regard to space restrictions. Thus work on the improved brake according to the invention can be carried out very easily, as compared with work on conventional brakes such as internal expanding shoe brakes and disc brakes. In this regard, to obtain access to the brake ring 15 and other parts of the brake, it is substantially only necessary to remove the hub 13 from the axle 10 since the wheels can remain fixed to the hub. When changing brake shoes, it is simply necessary to initially release the pins 17 and re-insert them subsequently. This is much easier than the work which has to be carried out in internal expanding shoe brakes or disc brakes.

It will also be apparent to those having ordinary skill in this art that various other features of the embodiment of the improved brake disclosed herein may be modified. Therefore, since the invention disclosed herein may be embodied in other specific forms without departing from the spirit or central characteristics thereof, the preferred embodiment of the invention described herein is therefore to be considered in all respects as illustrative and not restrictive, the scope of the invention being indicated by the claims rather than by the foregoing description, and all changes which come within the meaning and the range of equivalency of the claims are therefore intended to be embraced therein.

What is claimed is:

1. An improved trailer brake for motor vehicle trucks having an axle that has at least one tire mounted on a wheel rim attached to one end of the axle by a wheel hub and that has a longitudinal axis about which the wheel hub, wheel rim and tire rotate, comprising:

a brake ring connected with the wheel hub and wheel rim for rotation with the wheel hub, wheel rim and tire about the longitudinal axis of the axle, the brake ring having a radially outwardly directed, external, peripheral braking surface thereon that is spaced radially inwardly from the wheel rim and tire and that is spaced axially, with respect to the longitudinal axis of the axle, from the wheel hub;

at least one brake shoe having a braking surface thereon, the brake shoe being mounted so as to be adjacent to and radially outwardly from the brake ring and so as to be adjacent to and radially inwardly from the wheel rim and tire and having its braking surface disposed so that it may mate with at least a portion of the external peripheral braking surface of the brake ring;

hydraulic operating means mounted adjacent to the longitudinal axis of the axle at a point spaced axially, with respect to the longitudinal axis of the axle, from the brake ring, the wheel hub, the wheel rim and tire; and lever means extending between the hydraulic operating means and the brake shoe for connecting the hydraulic operating means with the brake shoe and for moving the braking surface of the brake shoe into braking contact with the external peripheral braking surface of the brake ring upon actuation of the hydraulic operating means, the lever means including: pivot means mounted on the axle at a point spaced between the hydraulic operating means and the radial plane in which the brake ring, wheel rim and tire are disposed; and a two-arm lever which includes a first arm and a second arm and which is connected with the pivot means for pivotable movement about a pivot axis transverse to the longitudinal axis of the axle so that each arm of the two-arm lever pivotably moves in a plane generally parallel to the longitudinal axis of the axle, with the first arm of the two-arm lever being disposed in a plane generally parallel to the longitudinal axis of the axle and having one of its ends operatively connected with the brake shoe and the other of its ends operatively connected with the pivot means, and with the second arm of the two-arm lever being disposed in a plane generally aligned with the longitudinal axis of the axle and having one of its ends operatively connected with the hydraulic operating means and the other of its ends operatively connected with the pivot means.

2. The improved brake described in claim 1 including first and second brake shoes which have braking surfaces thereon disposed adjacent to and adapted to mate with diametrically opposed portions of the external peripheral braking surface of the brake ring; wherein the lever means includes: first and second pivot means which are mounted at diametrically opposite points on the axle and are spaced between the hydraulic operating means and the radial plane in which the brake ring is disposed; and first and second two-arm levers, with the first lever being pivotably mounted, between its ends, on the first pivot means and having one of its ends operatively connected with the first brake shoe and having the other of its ends operatively connected with the hydraulic operating means, and with the second lever being pivotably mounted, between its ends, on the second pivot means and having one of its ends operatively connected with the second brake shoe and having the other of its ends operatively connected with the hydraulic operating means; wherein the hydraulic operating means includes a cylinder mounted in floating fashion adjacent to the axle so that the longitudinal axis of the cylinder is substantially transverse to the longitudinal axis of the axle; and wherein one end of the cylinder is connected with the other end of one of the two-arm levers and the other end of the cylinder is connected with the other end of the other of the two-arm levers.

3. The improved brake described in claim 1 wherein a spacer element is mounted between the wheel hub and the brake ring; and wherein the spacer element is a bladed wheel.

* * * * *